United States Patent [19]
Scott et al.

[11] Patent Number: 5,113,120
[45] Date of Patent: May 12, 1992

[54] DIMMER CIRCUIT

[76] Inventors: James D. Scott, 118 Moffet Ave., Joplin, Mo. 64801; Keith G. Kropf, Rte. 2, Box 152, Seneca, Mo. 64865

[21] Appl. No.: 713,954

[22] Filed: Jun. 11, 1991

[51] Int. Cl.$^5$ ............................................. H05B 37/00
[52] U.S. Cl. ..................................... 315/77; 315/158; 315/291
[58] Field of Search ................... 315/76, 77, 156, 158, 315/194, 199, 291, 294, 307, D164; 307/10.8

[56] References Cited

U.S. PATENT DOCUMENTS

| | | | |
|---|---|---|---|
| 3,731,172 | 5/1973 | Kaufman | 318/439 |
| 4,007,425 | 2/1977 | Salisbury | 328/3 |
| 4,029,991 | 6/1977 | Schultz | 315/77 X |
| 4,251,752 | 2/1981 | Stolz | 315/206 |
| 4,344,071 | 8/1982 | Allen | 340/566 |
| 4,358,714 | 11/1982 | Sechler et al. | 315/77 X |
| 4,368,406 | 1/1983 | Kruzich et al. | 315/77 X |
| 4,388,563 | 6/1983 | Hyltin | 315/205 |
| 4,700,111 | 10/1987 | Folwell | 315/200 |
| 4,949,020 | 8/1990 | Warren | 315/297 |

*Primary Examiner*—Robert J. Pascal
*Attorney, Agent, or Firm*—Head & Johnson

[57] ABSTRACT

A pulse width modulated dimmer for use with incandescent lamps is powered by a D.C. source that has full on/off capability with a substantially full range of light level control. The dimmer is designed to replace a switch in a lamp circuit in which the lamp is connected on one side to ground and on the other to the switch and then to the power source. The dimmer is designed to operate with a 10 to 30 volt D.C. source. It is controlled in both the on-off mode and in the brightness mode by an N channel field effect transistor switched in response to the voltage level of any remote variable voltage source, such as a potentiometer, photoresistor, phototransistor or digitally controlled voltage source. The lamp is powered through the field effect transistor which is in turn controlled by a comparator which compares the user or automatically variable control voltage level with a triangle wave ramp signal to control the on-off duty cycle and thus the brightness levels of the lamp. When the user or automatically variable voltage source is adjusted high, the field effect transistor is off and the lamp is off. If the user controlled voltage is set very low, the field effect transistor is fully on and the lamp is operated at the D.C. source voltage less the small voltage drop across the field effect transistor. As the user variable voltage is adjusted between the "off" and "on" conditions, the duty cycle of the field effect transistor will decrease as the variable voltage is increased, thus dimming the lamps.

12 Claims, 5 Drawing Sheets

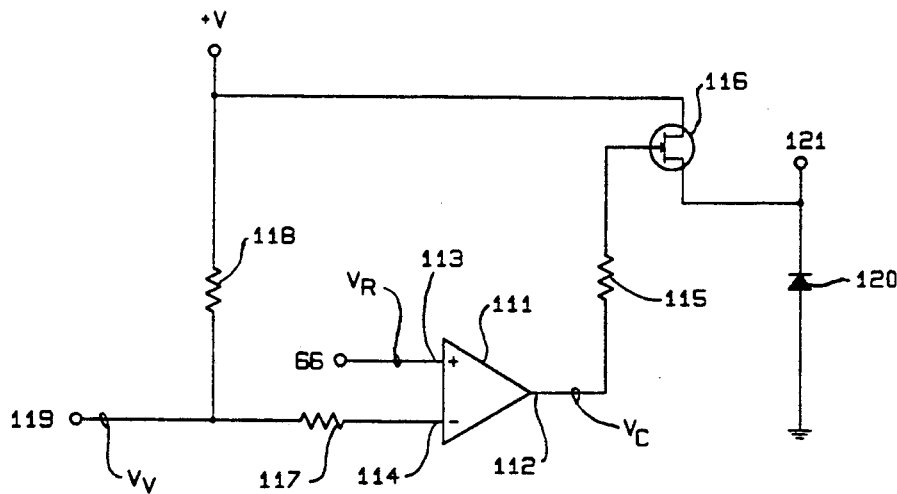
FIG. 5
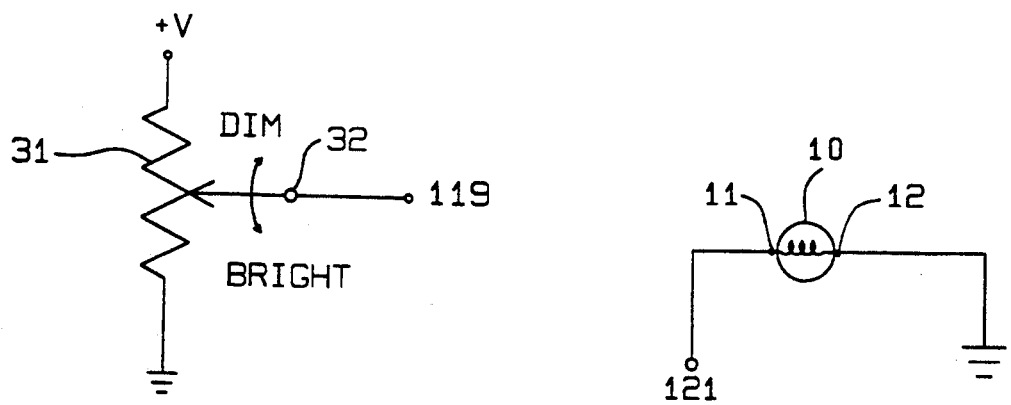
FIG. 6
FIG. 7

DIMMER CIRCUIT

BACKGROUND OF THE INVENTION

This invention relates generally to lighting control circuits and more particularly concerns control circuits for use with incandescent lamps powered by a D.C. source.

Low voltage D.C. lighting systems, such as those used in a wide variety of land, water and aircraft, are controlled by on/off switches connecting one terminal of the lamp load to a power source with the other terminal of the lamp load connected to ground. The lighting dimmer circuits presently found in vehicles control the brightness of the instrument panel lights in the vehicle. Brightness is generally controlled by a large potentiometer which varies the voltage delivered to the lamps by converting a considerable amount of energy into heat. One dimmer control circuit presently on the market utilizes a linear voltage regulator to vary the voltage to the lamps and thus vary the brightness. These methods are not only very inefficient but prohibit use of high wattage lamps unless a way to dissipate large amounts of heat is provided. Other systems presently available use two lamps controlled by one double throw or three position switch. In one switch position, both lamps are off; in another, a dim lamp is on; in the third, a bright lamp is on. Such systems have no flexibility and require the use of light fixtures with two lamps.

Pulse width modulation circuits (PWM) have been developed for controlling A.C. lamp circuits supporting both fluorescent and incandescent lamps and lamps powered by a pulsating D.C. source. However, these circuits are generally of the non-switching type, operating only in the PWM mode, and are relatively expensive.

It is, therefore, an object of this invention to provide a PWM dimmer for use with incandescent lamps powered by a low-voltage D.C. source. A further object of this invention is to provide a PWM dimmer with full on/off capability as well as a substantially full range of brightness level control. Another object of this invention is to provide a PWM dimmer that can be used to directly replace the on/off switches commonly used in modern motor vehicle wiring systems. Yet another object of this invention is to provide a PWM dimmer that is highly efficient, operating at relatively low frequencies. It is also an object of this invention to provide a PWM dimmer that is small, inexpensive and reliable. Furthermore, it is among the objects of this invention to provide a PWM dimmer which is user variable or automatically variable to control brightness.

SUMMARY OF THE INVENTION

In accordance with the invention a pulse width modulated dimmer is provided for use with incandescent lamps powered by a D.C. source that has full on/off capability with a substantially full range of light level control. The dimmer is designed to replace a switch in a lamp circuit in which the lamp is connected on one side to ground and on the other to the switch and then to the power source. The dimmer is designed to operate with a 10 to 30 volt D.C. source. It is controlled in both the on-off mode and in the brightness mode by an N channel field effect transistor switched in response to the voltage level of any remote variable voltage source, such as a potentiometer, photoresistor, phototransistor or digitally controlled voltage source. The lamp is powered through the field effect transistor which is in turn controlled by a comparator which compares the user or automatically variable control voltage level with a triangle wave ramp signal to control the on-off duty cycle and thus the brightness levels of the lamp. The triangle wave is generated by a ramp voltage generator controlled by a square wave generating voltage comparator. The voltage comparator output is processed by a charge pump voltage doubler to provide a higher voltage to the gates of the field effect transistors, permitting the use of N rather than P channel field effect transistors to switch the load current. When the user or automatically variable voltage source is adjusted high, the field effect transistor is off and the lamp is off. If the user controlled voltage is set very low, the field effect transistor is fully on and the lamp is operated at the D.C. source voltage less the small voltage drop across the field effect transistor. As the user variable voltage is adjusted between the "off" and "on" conditions, the duty cycle of the field effect transistor will decrease as the variable voltage is increased, thus dimming the lamps.

BRIEF DESCRIPTION OF THE DRAWINGS

Other objects and advantages of the invention will become apparent upon reading the following detailed description and upon reference to the drawings in which:

FIG. 5 is a schematic diagram of the preferred embodiment of the comparator circuit of the dimmer circuit;

FIG. 6 is a schematic diagram of the user variable control of the dimmer circuit;

FIG. 7 is a schematic diagram illustrating the connection of the lamp to the dimmer circuit;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
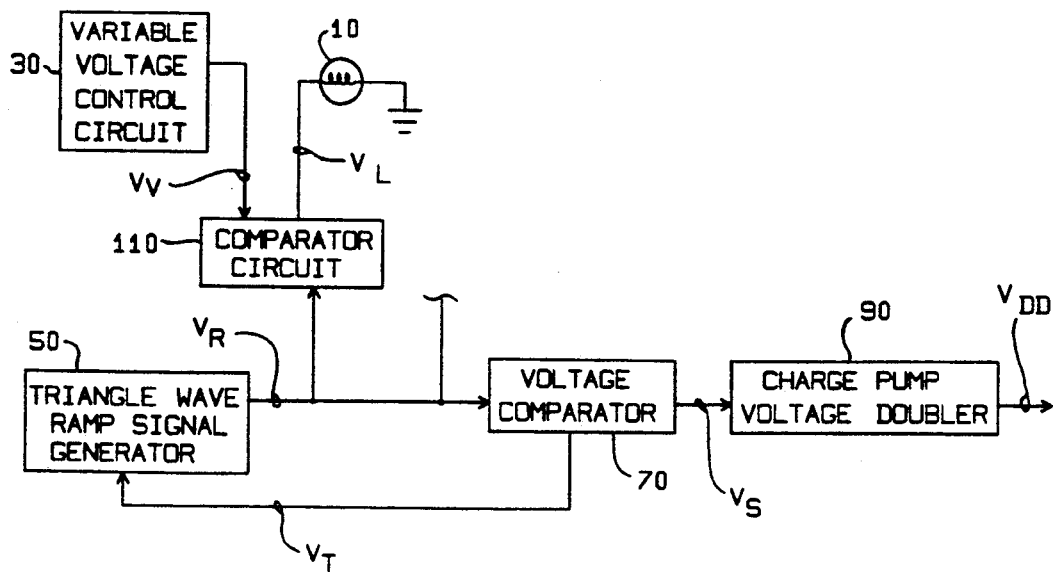
FIG. 1 is a block diagram illustrating a preferred embodiment of the dimmer circuit.

Turning first to FIG. 1, a preferred embodiment of the total dimmer circuit is illustrated in block diagram.

One or more incandescent lamps 10 powered by a D.C. source are controlled by one or more variable voltage control circuits 30, preferably one for each lamp or group of lamps 10. The dimemr circuit includes a triangle wave ramp signal generator or operational amplifier integrator 50, a voltage comparator 70 which acts as a 50% duty cycle square wave oscillator, a charge pump voltage doubler 90 and at least one comparator circuit 110, one controlling the voltage to each lamp or group of lamps 10 connected thereto.

Figure 2:
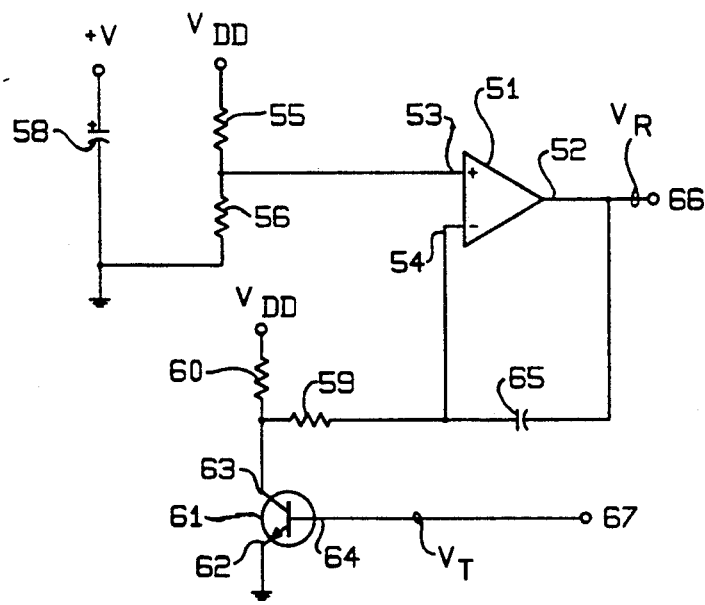
FIG. 2 is a schematic diagram illustrating the preferred embodiment of the triangle wave ramp voltage generator of the dimmer circuit.

As shown in FIG. 2, the triangle wave ramp signal generator 50 includes an operational amplifier 51 with an output 52, a non-inverting input 53 and an inverting input 54. The non-inverting input 53 is connected through a first resistor 55 to a positive biasing voltage $V_{DD}$ and through a second resistor 56 to ground establishing a voltage divider setting the non-inverting input 53 at one-third $V_{DD}$. The supply voltage $+V$ is connected to ground through a power supply decoupling capacitor 58. The inverting input 54 of the operational amplifier 51 is connected to the biasing voltage $V_{DD}$ through third and fourth resistors 59 and 60. A transistor 61 has its emitter 62 connected to ground, its collector 63 connected between the third and fourth resistors 59 and 60 and its base connected to a terminal point 67 to be hereinafter further described. The output 52 of the operational amplifier 51 is also connected through a capacitor 65 to the operational amplifier inverting input 54. As the transistor 61 is switched on and off, it in turn switches the ramp state of the operational amplifier 51 as will hereinafter be explained.

Figure 3:
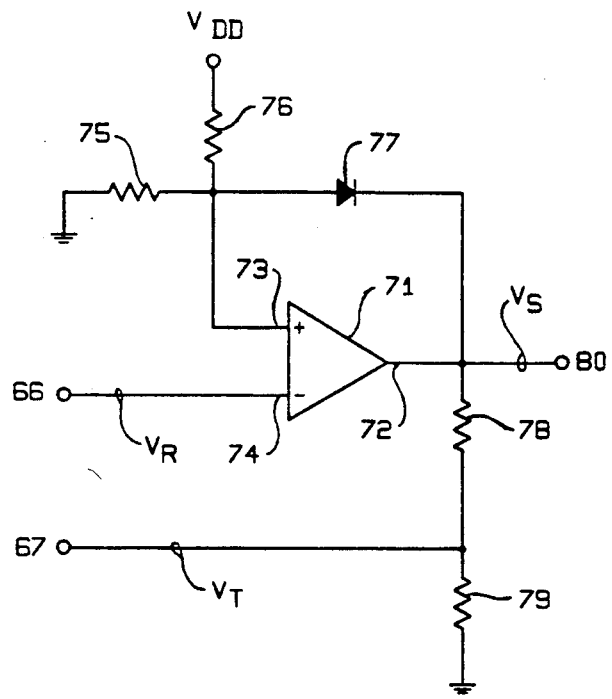
FIG. 3 is a schematic diagram illustrating the preferred embodiment of the square wave generator or voltage comparator circuit of the dimmer circuit.

The voltage comparator circuit 70 is illustrated in FIG. 3. It includes an operational amplifier 71 having an output 72, a non-inverting input 73 and an inverting input 74. The inverting input 74 is connected to the output $V_R$ of the ramp signal generator circuit 50 at the terminal 66. The non-inverting input 73 is connected through a resistor 75 to ground, through a resistor 76 to a biasing voltage $V_{DD}$ and through a diode 77 to the operational amplifier output 72. The operational amplifier output 72 is connected through a pair of resistors 78 and 79 to ground to form a voltage divider for returning a portion $V_T$ of the output voltage $V_S$ of the operational amplifier 71 to the base of the transistor 61 via the terminal 67 also shown in FIG. 2.

Figure 4:
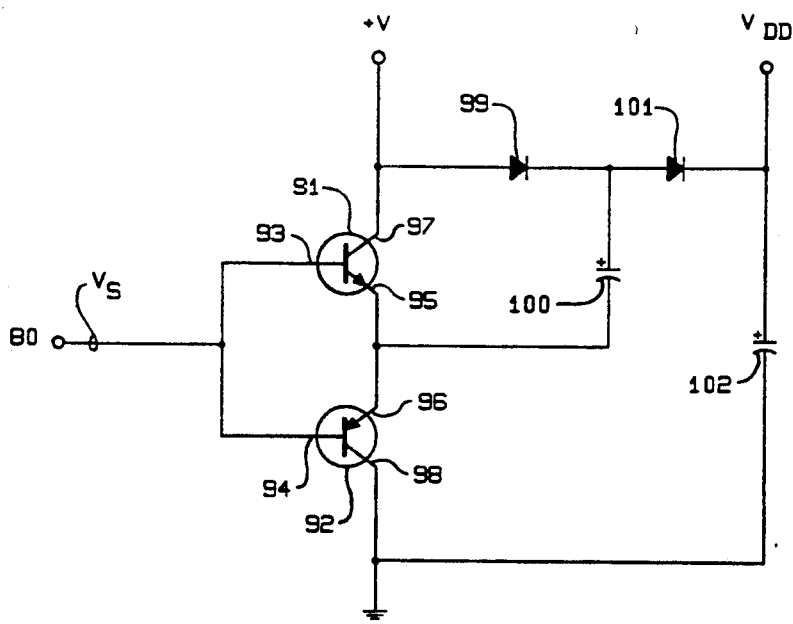
FIG. 4 is a schematic diagram of a preferred embodiment of the charge pump voltage doubler circuit of the dimmer circuit.

The charge pump voltage doubler 90 as shown in FIG. 4 includes a pair of transistors 91 and 92 having bases 93 and 94, emitters 95 and 96 and collectors 97 and 98. The bases 93 and 94 are both connected to the output terminal 80 of the voltage comparator circuit 70. The emitter 95 of the first transistor 91 is connected to the emitter 96 of the second transistor 92. The collector 97 of the first transistor 91 is connected to a 10 to 30 volt D.C. voltage source $+V$ and the collector 98 of the second transistor 92 is connected to ground. The D.C. voltage source $+V$ is also connected to the emitter 96 of the second transistor 92 through a first diode 99 and a first capacitor 100. In addition, the D.C. voltage source $+V$ is connected through the first diode 99 and a second diode 101 and second capacitor 102 to the collector 98 of the transistor 92. The voltage doubler circuit output voltage $V_{DD}$ is derived between the second diode 101 and the second capacitor 102.

The comparator circuits 110 are illustrated in a single typical schematic shown in FIG. 5. An operational amplifier 111 has an output 112, a non-inverting input 113 and an inverting input 114. The non-inverting input 113 is connected at terminal 66 to the output $V_R$ of the ramp signal generator 50. The output 112 of the operational amplifier 111 is fed through a resistor 115 to control a field effect transistor 116 which controls the current to the lamp 10 from the D.C. voltage source $+V$. The inverting input 114 is connected to the D.C. voltage source $+V$ through a pair of inverting input resistors 117 and 118. An additional biasing voltage will be applied between the pair of inverting input resistors 117 and 118 at terminal 119 which is connected to the variable voltage source 30. The field effect transistor 116 is connected through a diode 120 to ground and also through a terminal 121 connected to the lamp or group of lamps 10.

FIG. 6 illustrates a user variable brightness controller in the form of a potentiometer 31 adjustable by the user. The potentiometer 31 is connected between the D.C. voltage source $+V$ and ground with its divider 32 being connected via a terminal 119 through one of the inverting input resistors 117 to the inverting input 114 of the operational amplifier 111 in the comparator circuit 110.

FIG. 7 illustrates a typical incandescent lamp having two terminals 11 and 12 with one terminal 11 connected to the comparator circuit output terminal 121 and the other terminal 12 connected to ground. This represents the typical lamp connection used in most vehicles today. The typical vehicle on/off switch (not shown) is normally connected to the ungrounded terminal 11 of the lamp 10. To incorporate the present dimmer circuit, the vehicle switch is disconnected and the present dimmer circuit connected to the positive lamp terminal 11.

Figure 8:
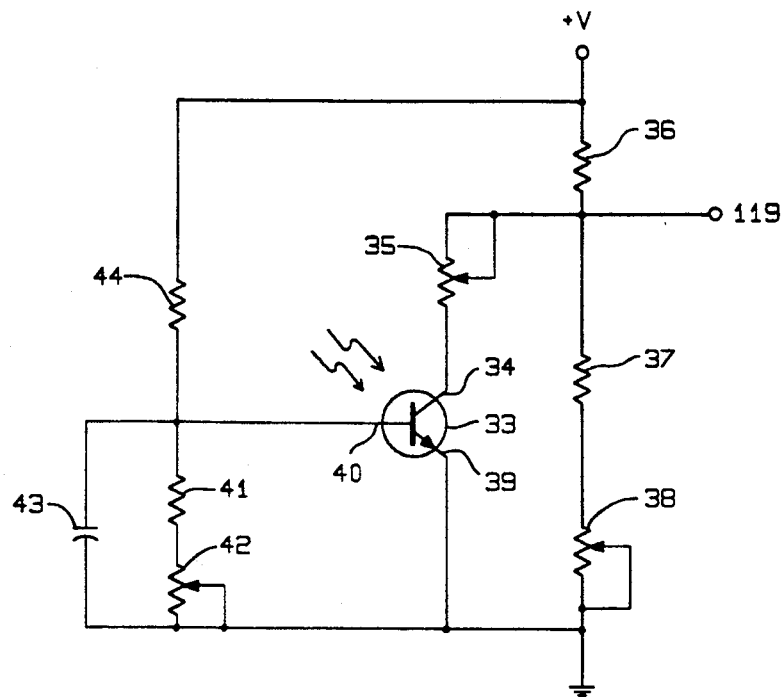
FIG. 8 is a schematic diagram of an automatic variable control which may be used in place of or in conjunction with the user variable control of FIG. 6.

FIG. 8 illustrates a photo transistor 33 which may be connected between the D.C. source $+V$ and the variable voltage source terminal 119 to automatically vary the voltage at the inverting input 114 of the operational amplifier 111 of the comparator circuit. The collector 34 of the photo transistor 33 is connected through a maximum brightness potentiometer 35 to the terminal 119 as shown in FIG. 5, through the potentiometer 35 and a resistor 36 to the D.C. voltage source $+V$ and through the potentiometer 35, a resistor 37 and a minimum brightness adjusting potentiometer 38 to the emitter 39 which is also connected to ground. The base 40 of the phototransistor 33 is connected through a resistor 41 and a sensitivity potentiometer 42 in parallel with a capacitor 43 to ground and also through another resistor 44 to the D.C. voltage source $+V$. The capacitor 43 will dampen the response of the photo transistor 33. Thus, the brightness of the lamp 10 does not appreciably change in response to a transient shift in ambient light. The potentiometers 35, 38 and 42 allow the circuit to be set such that the minimum and maximum brightness levels can be set, as well as the sensitivity to changes in ambient light.

Figure 9:
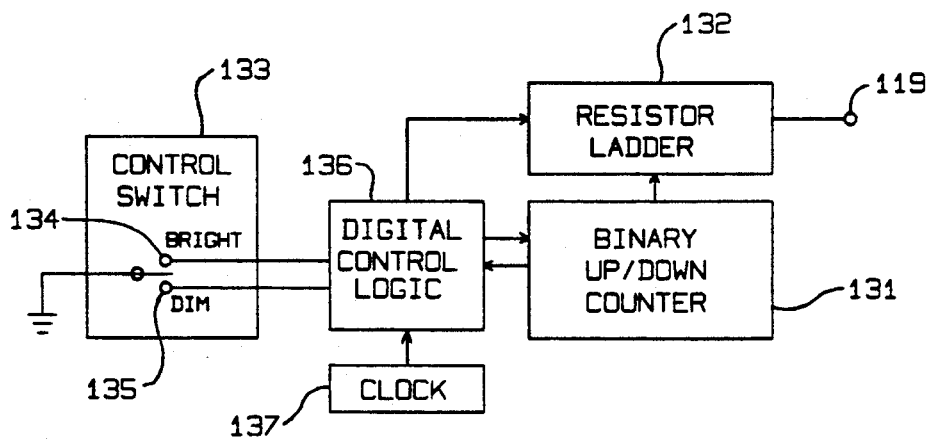
FIG. 9 is a block diagram of a digital variable voltage control circuit which may be used in place of the user variable control of FIG. 6.

FIG. 9 illustrates a digital variable voltage control circuit which may be connected at the variable voltage source terminal 119 as shown in FIG. 5 as an alternative user variable control. Using a binary up/down counter 131, which may be a standard digital logic IC such as the RCA part number CD4516BC, when the binary count is at a maximum (1111), the lamp 10 is off and when the binary count is at a minimum (0000), the lamp 10 is at full brightness. The binary counter 131 outputs to a resistor ladder 132 which converts the digital signals to an analog voltage. This analog voltage is input to the comparator circuit 110 at terminal 119.

A control switch 133 allows the user interface to the circuit. By depressing either the bright 134 or dim 135 switch, the user can increment the brightness of the lamp 10 from off to full on in sixteen steps. The control switch 133 can be one or several paralleled 3 position momentary contact switches.

The control logic circuit 136 accepts inputs from the control switch 133 and, by use of a clock 137, clocks these inputs into the binary counter 131. The digital control logic circuit 136 also stops the binary count at the upper and lower limits, so that the bright switch 134 will increase the lamp brightness to full on, then ignore any more inputs from the bright switch 134. The dim switch 135 performs the reverse function.

Figure 10:
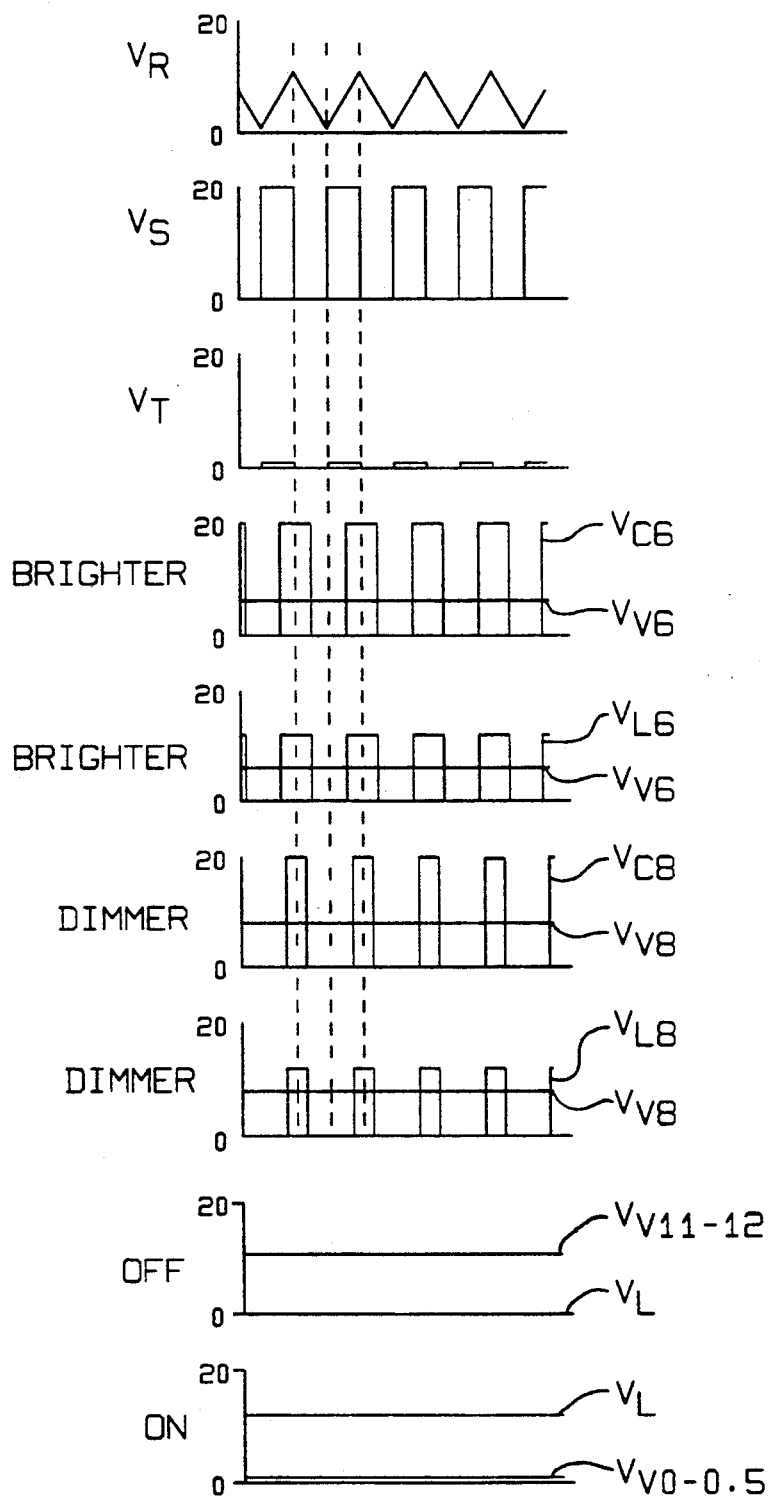
FIG. 10 is a graphic comparison of the waveforms present at various points in the dimmer circuit during its operation.

With reference to all of the above circuits and in particular with reference to the waveform graphs of FIG. 10, the overall operation of the dimmer circuit can now be explained. The ramp signal generator 50 and the voltage comparator 70 operate dependently to form a triangle and square wave generator. The ramp signal generator operational amplifier 51 generates a ramp voltage $V_R$ which is applied to the voltage comparator operational amplifier 71. The operational amplifier 71 acts as a voltage comparator and switches the transistor 61 connected to the inverting input 54 of the ramp signal generator operational amplifier 51 on and off. This causes the ramp signal generator operational amplifier 51 to switch the ramp state of its output $V_R$ between a rising and falling voltage. The voltage divider established by the non-inverting input resistors 55 and 56 set the noninverting input 53 of the ramp signal generator operational amplifier 51 at $\frac{1}{3} V_{DD}$. This operational amplifier 51 will drive its output 52 to maintain its inverting input 54 at $\frac{1}{3} V_{DD}$. With its inverting input transistor 61 initially off, a constant current will flow through the inverting input resistors 60 and 59 so as to maintain the inverting input 54 at $\frac{1}{3}V_{DD}$, there being a constant voltage drop of 2/3 $V_{DD}$ across those resistors 60 and 59. Thus, the inverting input capacitor 65 begins to charge. As the current must be constant through the inverting input resistors 60 and 59 and the capacitor 65, the output voltage $V_R$ must fall at a constant rate, that is on a negative slope linear ramp, to maintain the constant current. When the inverting input transistor 61 switches on, as will hereinafter be explained, it provides a short circuit to ground, thus immediately reversing the current direction through one of the inverting input resistors 59 to again maintain the inverting input 54 at $\frac{1}{3}$ $V_{DD}$. For a constant current to flow through the inverting input capacitor 65 and the resistor 59 to ground, the output $V_R$ of the operational amplifier 51 must rise at a constant rate, providing a positive slope linear ramp. The output $V_R$ continues to rise until the transistor 61 is again switched off and the cycle repeats.

For the circuit to operate correctly, the ramp signal $V_R$ must be switched from a positive slope to a negative slope while the operational amplifier is operating in the linear region. Therefore, the transistor 61 must be switched before the output $V_R$ rises to its maximum of $V_{DD}$ minus 1.5 volts or falls to its minimum of approximately 0 volts. This is accomplished by use of the output of the operational amplifier 71 of the voltage comparator circuit 70. The voltage comparator output $V_S$ is a square wave with a 50% duty cycle at approximately 70 Hz. The non-inverting input resistors 75 and 76 of the operational amplifier 71 set the high limit of the ramp while the low limit of the ramp is set by the diode 77. The output ramp signal $V_R$ of the ramp signal generator operational amplifier 51 is tied to the inverting input 74 of the voltage comparator operational amplifier 71. When the ramp signal $V_R$ is ramping up, the non-inverting input 73 to the voltage comparator operational amplifier 71 is $\frac{1}{2} V_{DD}$, which is greater than its inverting input 74. Therefore, the output $V_S$ of the voltage comparator operational amplifier 71 is $V_{DD}$ minus 1.5 volts. In this condition, the diode 77 is reverse biased and the switching transistor 61 is on. The voltage comparator inverting input $V_R$ ramps upward until the inverting 74 and non-inverting 73 inputs are equal, at which point the voltage comparator output 72 switches to ground, shutting off the switching transistor 61. The diode 77 is therefore forward biased, so that the output ramp voltage $V_R$, which is falling since the switching transistor 61 is turned off, will continue to fall until the ramp voltage $V_R$ reaches about 0.7 volts. The output of the voltage comparator operational amplifier 71 is approximately a 70 Hz 50% duty cycle square wave $V_S$. The duty cycle is approximately 50% because the charge and discharge times of the capacitor 65 are equal. The signal $V_T$ to the switching transistor 61 is reduced in level by the voltage divider formed by the pair of resistors 78 and 79.

The output signal $V_S$ of the voltage comparator operational amplifier 71 also drives the charge pump voltage doubler circuit 90. In this circuit 90, the two transistors 91 and 92 act as a complementary follower to form a current booster. When the output $V_S$ of the voltage comparator operational amplifier 71 is low, one transistor 91 is off and the other transistor 92 is on. Therefore, the capacitor 100 is charged from the voltage source +V through the forward biased diode 99. When the output $V_S$ of the voltage comparator operational amplifier 71 is high, the transistors 91 and 92 switch their on-off relationship. Given a 12 volt source, when power is first applied to the circuit, the second voltage doubler circuit capacitor 102 will charge to approximately 10.6 volts. Therefore $V_{DD}$ is initially 10.6 volts which is sufficient voltage to bootstrap all of the circuitry. The first capacitor 100 will charge to 10.6 volts when the other transistor 92 switches on. When the one transistor 91 switches on and the other transistor 92 switches off, the negative terminal of the first capacitor 100 is raised to approximately 11.3 volts (+V minus the drop across the transistor). The second capacitor 102 is now charged by the circuit formed by stacking capacitor 100 on top of the voltage source +V. That is, positive charge flows from the voltage source +V through the one transistor 91, through the first capacitor 100, through the second diode 101 onto the second capacitor 102. It is this supply $V_{DD}$ which runs all of the circuitry allowing the outputs 112 of the lamp control comparator operational amplifiers 111 to drive at least 8 volts above the drain voltage of the power field effect transistors 116, which will switch the N channel field effect transistors 116 into saturation. As a result of the increased output voltage $V_C$ of the operational amplifiers 111, N channel rather than P channel field effect transistors can be used in a source follower mode to switch the lamps 10. By connecting the lamps 10 to the source of the field effect transistors 116, the circuit is compatible with the standard wiring practices in the automobile industry which require that all the lamps 10 have one terminal tied to the frame ground. A large number of comparator circuits 110 can be connected to the ramp signal $V_R$, limited only by the ability of the charge pump doubler circuit 90 to supply power to the operational amplifiers 111 of the comparator circuits 110. Each comparator circuit 110 is controlled by an independent variable voltage device 30 external to the comparator circuit 110 which in turn controls the lamp 10 or lamps 10 connected in parallel to its respective comparator circuit 110.

In the operation of the lamp control comparator circuits 110, the inverting input resistor 118 pulls the inverting input 114 high if no voltage is applied at the terminal 119 from the variable voltage source 30. This turns off the field effect transistor 116. The other inverting input resistor 117 is necessary only to protect the input junction of the operational amplifier 111. The diode 120 connecting the field effect transistor 116 to ground acts as a snubber to protect the field effect transistor 116 from inductive reverse voltage spikes and the diode 120 may be omitted if only non-inductive loads are to be connected to the field effect transistor 116. The output $V_C$ of the comparator operational amplifier 111 will be either high, approximately 10 volts above the supply voltage +V, or low, approximately 0 volts. A variable voltage ranging from 0 to the supply voltage +V from the variable voltage source 30 is applied to the inverting input 114 via the inverting input terminal 119 and resistor 117. When the ramp signal $V_R$ applied to the non-inverting input 113 of the amplifier 111 is higher than the voltage $V_V$ made available from the variable voltage source 30, the output $V_C$ of the comparator operational amplifier 111 is high and the field effect transistor 116 is saturated. The on time for the field effect transistor 116 extends only for as long as the ramp signal $V_R$ is higher than the voltage $V_V$ made available by the variable voltage source 30. The peak of the ramp signal $V_R$ is set at about one to two volts below the supply voltage +V and the minimum of the ramp signal $V_R$ is set at 0.7 volts above ground.

The voltage available from the variable voltage source 30 has variable limits such that the dimemr circuit operates within the PWM mode or outside the PWM mode. For a +V equal to 12 volts, if the available voltage $V_V$ is set at 11 to 12 V, the comparator output $V_C$ tied to the gate of the field effect transistor 116 never goes high, so the field effect transistor 116 is off and the lamps 10 are off, as demonstrated by the "OFF" waveform of FIG. 10. If the voltage is set at 0 to 0.5 volts, the output $V_C$ never goes low, so the field effect transistor 116 is turned on and does not pulse. Therefore, the lamp 10 will see a constant D.C. voltage $V_L$ equivalent to the source voltage minus a small voltage drop across the field effect transistor 116, as demonstrated by the "ON" waveform of FIG. 10. When the available voltage $V_V$ from the variable voltage source 30 is set at any intermediate point between its approximate maximum or minimum, the circuit will operate within the PWM mode. For example, looking at the "BRIGHTER" waveforms of FIG. 10, when the available voltage $V_V$ is set at 6 volts $V_{V6}$, the field effect transistor 116 switches at 70 Hz with an on time of about 50% so that the lamps 10 are on but not at full brightness, as shown in FIG. 10 as $V_{L6}$ waveform. Looking at the "DIMMER" waveforms of FIG. 10, by increasing the available voltage $V_V$ from the variable voltage source 30 to eight volts $V_{V8}$, the duty cycle of the field effect transistor 116 is lowered, thus dimming the lamps 10 further, as is shown in waveform $V_{L8}$. Thus, it will be seen that, by varying the available voltage $V_V$, the lamp brightness can be varied smoothly from full off to full on.

In one preferred embodiment of the dimmer, the components are as follows:

| CIRCUIT ELEMENT | NUMBERS | TYPE |
| --- | --- | --- |
| lamps | 10 | 12 volt GE 1156 |
| potentiometer | 31 | 10K ohm linear taper |
| potentiometer | 35, 42 | 5K ohm |
| potentiometer | 38 | 100K ohm |
| phototransistor | 33 | MRD 300 |
| transistor | 61, 91 | 2N4401 |
| transistor | 92 | 2N4403 |
| op amp | 51, 71, 111 | ¼LM324 (LM148 for +V = 30V) |
| FET | 116 | IRFZ20 |
| diodes | 77, 101 | 1N4148 |
| diodes | 99 | 1N4148 (1N4742 12V zener for +V = 30 volts) |
| diode | 120 | 1N4001 |
| capacitors | 43 | 10uf |
| capacitors | 58, 100, 102 | 100uf |
| capacitors | 65 | 0.1uf |
| resistor | 36, 37, 41 | 3.3K ohm |
| resistor | 44 | 150K ohm |
| resistor | 55, 75, 76, 78, 115, 118 | 100K ohm |
| resistor | 55, 59, 60, 79, 117 | 47K ohm |

It will be apparent to those skilled in the art that the above design provides a low cost, low loss control circuit. Highest losses occur during switching in the field effect transistors 116. Since the present circuit operates the field effect transistors 116 either saturated or cutoff, and the design minimizes switching frequency, it also minimizes the losses in the field effects transistors 116 while adding little cost to the rest of the circuit. Since the field effect transistors 116 are fully on when the lamps 10 are at full brightness, there is no switching loss during the full on time period. Preferably, the power field effect transistors 116 will have a saturation resistance less than or equal to 0.1 ohms.

As previously noted, a large number of comparator circuits 110, each controlled by separate variable voltage sources 30 and each powering one or more lamps 10 connected in parallel can be connected to the ramp signal $V_R$, so long as the charge pump voltage doubler 90 provides sufficient power to the system.

The above circuit can be operated with up to a 30 volt D.C. source by changing the first rectifier diode 99 in the voltage doubler circuit 90 to a zener diode and by changing other circuit components to components rated for the higher voltage.

Thus, it is apparent that there has been provided, in accordance with the invention, a dimmer circuit that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An illumination level controller for incandescent lamps powered by a low voltage dc source comprising:
   means for generating a positively and negatively linear voltage triangle wave signal; and
   at least one output means each comprising:
     an input variable voltage source;
     comparator means for receiving a voltage from said input variable voltage source and said linear triangle wave signal and for producing as an output signal:
a constant dc voltage when said received voltage is at a predetermined minimum;
a zero voltage when said received voltage is at a predetermined maximum; and
a variable duty cycle high pulse train when said received voltage is less than said maximum and greater than said minimum; and
an N channel field effect transistor in a source follower mode for connection in series between a grounded incandescent lamp load and a dc source, for receiving said output signal to control the operation of said transistor in response thereto whereby, when said output signal is:
a constant dc voltage, said transistor is saturated and the load is fully 'on';
a zero voltage, said transistor and the load are fully 'off'; and
a variable, said transistor is in a switching mode to inversely vary the brightness of the load in response to the level of said variable output.

2. An illumination level controller for incandescent lamps powered by a low voltage dc source comprising:
first means for generating a triangle wave signal;
second means for receiving said triangle wave signal and generating a square wave signal in response thereto;
third means for receiving and amplifying said square wave signal;
control means for receiving said square wave signal and switching said first means in response thereto to maintain linearity of said triangle wave signal; and
at least one output means each comprising:
an input variable voltage source;
comparator means for receiving a voltage from said input variable voltage source and said linear triangle wave signal and for producing as an output signal:
a constant dc voltage when said received voltage is at a predetermined minimum;
a zero voltage when said received voltage is at a predetermined maximum; and
a variable duty cycle high pulse train when said received voltage is less than said maximum and greater than said minimum; and
an N channel field effect transistor in a source follower mode for connection in series between a grounded incandescent lamp load and a dc source, for receiving said output signal to control the operation of said transistor in response thereto whereby, when said output signal is:
a constant dc voltage, said transistor is saturated and the load is fully 'on';
a zero voltage, said transistor and the load are fully 'off'; and
a variable duty cycle high pulse train, said transistor is in a switching mode to inversely vary the brightness of the load in response to the level of said variable output.

3. An illumination level controller for incandescent lamps powered by a low voltage dc source comprising:
a ramp generator for producing at triangle wave signal;
a first voltage comparator for receiving said triangle wave signal and producing a square wave signal in response thereto;
a charge pump voltage doubler for receiving and multiplying said square wave signal;
a transistor for receiving said square wave signal and for switching said first means in response thereto to maintain upward and downward linearity of said triangle wave signal; and
at least one output circuit each comprising:
an input variable voltage source;
a second voltage comparator for receiving a voltage from said input variable voltage source and said linear triangle wave signal and for producing as an output signal:
a constant dc voltage when said received voltage is at a predetermined minimum;
a zero voltage when said received voltage is at a predetermined maximum; and
a variable duty cycle high pulse train when said received voltage is less than said maximum and greater than said minimum; and
an N channel field effect transistor in a source follower mode for connection in series between a grounded incandescent lamp load and a dc source, for receiving said output signal to control the operation of said field effect transistor in response thereto whereby, when said output signal is:
a constant dc voltage, said field effect transistor is saturated and the load is fully 'on';
a zero voltage, said field effect transistor and the load are fully 'off'; and
a variable duty cycle high pulse train, said field effect transistor is in a switching mode to inversely vary the brightness of the load in response to the level of said variable output.

4. A controller according to claim 1, said input variable voltage source comprising a user variable potentiometer.

5. A controller according to claim 1, said input variable voltage source comprising a photo resistor.

6. A controller according to claim 1, said input variable voltage source comprising a photo transistor.

7. A controller according to claim 1, said input variable voltage source comprising a digital control circuit.

8. A controller according to claim 1, the low level dc source being approximately 12 volts, said linear triangle wave voltage having a peak of approximately 11 volts and a nadir of approximately 0.7 volts and the level of said output signal being approximately 20.5 volts.

9. A controller according to claim 1, the low level dc source being approximately 24 volts, said linear triangle wave voltage having a peak of approximately 23 volts and a nadir of approximately 0.7 volts and the level of said output signal being approximately 36 volts.

10. A controller according to claim 2, the low level dc source being approximately 12 volts, said linear triangle wave voltage having a peak of approximately 11 volts and a nadir of approximately 0.7 volts, the level of said output signal being approximately 20.5 volts and said second means having approximately a 70 Hz 50% duty cycle.

11. A controller according to claim 2, the low level dc source being approximately 24 volts, said linear triangle wave voltage having a peak of approximately 23 volts and a nadir of approximately 0.7 volts, the level of said output signal being approximately 36 volts and said second means having approximately a 70 Hz 50% duty cycle.

12. An illumination level controller for incandescent lamps powered by a low voltage dc source comprising:

means for generating a generally positively and negatively linear voltage triangle wave signal; and at least one output means each comprising:
  an input variable voltage source;
  comparator means for receiving a voltage from said input variable voltage source and said triangle wave signal and for producing as an output signal:
    a constant dc voltage when said received voltage is at a predetermined minimum;
    a zero voltage when said received voltage is at a predetermined maximum; and
    a variable duty cycle high pulse train when said received voltage is less than said maximum and greater than said minimum; and
  a field effect transistor for connection in series between a grounded incandescent lamp load and a dc source, for receiving said output signal to control the operation of said transistor in response thereto whereby, when said output signal is:
    a constant dc voltage, said transistor is saturated and the load is fully 'on';
    a zero voltage, said transistor and the load are fully 'off'; and
    a variable, said transistor is in a switching mode to inversely vary the brightness of the load in response to the level of said variable output.

* * * * *